United States Patent [19]
Andeen et al.
[11] Patent Number: 4,647,945
[45] Date of Patent: Mar. 3, 1987

[54] IMAGE RECORDING METHOD AND ITS APPARATUS

[75] Inventors: Gerry B. Andeen, Menlo Park, Calif.; Yasuo Matsumoto, Shizuoka, Japan; Patricia O. Cohn, Redwood City, Calif.

[73] Assignee: Tokyo Electric Co., Ltd., Tokyo, Japan

[21] Appl. No.: 826,788

[22] Filed: Feb. 6, 1986

[51] Int. Cl.[4] .............................................. G01D 15/18
[52] U.S. Cl. ...................................... 346/1.1; 68/5 D; 346/75; 358/75
[58] Field of Search .......................... 346/1.1, 75, 140; 68/5 D; 8/149.1, 149.2; 358/75, 296

[56] References Cited

U.S. PATENT DOCUMENTS 3,632,291 1/1972 Dedage .................................... 8/2.5
3,950,967 4/1976 Davies et al. ......................... 68/5 D

FOREIGN PATENT DOCUMENTS 50-11291 9/1975 Japan .
52-13861 11/1977 Japan .
55-76149 6/1980 Japan .
57-13247 7/1982 Japan .
58-8189 1/1983 Japan .

OTHER PUBLICATIONS

M. L. Levene et al., "Material Transfer Recording", *Applied Optics*, vol. 9, No. 10, Oct. 1970.
C. A. Bruce and J. T. Jacobs, "Laser Transfer of Volatile Dyes", *Journal of Applied Photographic Engineering*, vol. 3, No. 1, Winter 1977.
R. S. Braudy, "Laser Writing", *Proceedings of IEEE*, Oct. 1968.
Robert S. Braudy, "Characteristics of Organic Colorants Transferred by Laser Scanning", *Journal of Applied Physics*, vol. 45, No. 8, Aug. 1974.

*Primary Examiner*—Joseph W. Hartary
*Attorney, Agent, or Firm*—Cushman, Darby & Cushman

[57] ABSTRACT

Disclosed is an image recording method and its apparatus, in which dye vapor generated by heating sublimable dye is mixed with condensable vapor generated by heating condensable substance and formed into mixed vapor having higher pressure than the pressure outside a recording head and the mixed vapor thus formed and provided with a force to blow out by the pressure difference between inside and outside the recording head is adapted to jet from a nozzle with its jet amount controlled by control means, and according to which, high speed image recording is made possible although the temperature for heating the sublimable dye can be kept low, and the condensable vapor included in the mixed vapor is cooled while flying or upon reaching the surface of a recording member to reduce in volume, and therefore, the picture element is made smaller in diameter and spreading out of the jet around the nozzle along the surface of the recording member is prevented so that recording of high resolution is made possible.

12 Claims, 14 Drawing Figures

IMAGE RECORDING METHOD AND ITS APPARATUS

FIELD OF THE INVENTION AND RELATED ART STATEMENT

The present invention relates to an image recording method and its apparatus which jets dye vapor produced by vaporization of sublimable dye to a surface of a recording medium for forming thereon characters and patterns.

There have so far been proposed various methods which use sublimable dyes for picture image recording, a few of which will be exemplified as follows.

First, there is a method disclosed in Japanese Patent Publication No. 56-2020, which is as shown in FIGS. 12 and 13. Referring to one example as shown in FIG. 12, there are provided a nozzle 2 including sublimable dye 1, a recording member 3, a charging electrode 4 disposed therebetween, an electrostatic lens system 5, and electrostatic deflecting electrodes 6, wherein dye vapor 8 is generated by heating the dye by a heater 7 provided in the nozzle 2 and the dye vapor 8 is charged with electricity by the charging electrode 4. While the charged dye vapor 8 flies toward a back plate 9 disposed in the back of the recording member 3, the flying dye vapor 8 is converged by the electrostatic lens systems 5 and deflected by the electrostatic deflecting electrodes 6 and attached to the surface of the recording member 3.

And, the other example as shown in FIG. 13 is provided with an electrostatic shutter 10 instead of the electrostatic deflecting electrodes 6 in the structure of FIG. 12, and the jet amount of the dye vapor 8 to the recording member 3 is controlled by the electrostatic shutter 10.

As systems using a plurality of such fundamental arrangements of recording method as described above to achieve color recording, there are such as disclosed in Japanese Patent Laid-open Nos. 54-71636 and 54-71637.

In these systems, the jetting of the dye vapor 8 is effected only by the vapor pressure of the dye vapor 8, an there is no means provided to jet it by force. Since the vapor pressure of the dye vapor 8 in general is very low in the normal operating temperature range, the same is unable to acquire sufficient jetting pressure, and so it was difficult to make high speed recording with such a system.

In order to heighten the vapor pressure of the dye vapor 8, the heating temperature for the dye must be elevated. It is, however, not practicable since there occurs another problem, decomposition of the molecules of the dye, due to the elevated heating temperature.

A second method in the prior art is that which is described in Japanese Patent Laid-open No. 59-22759 as shown in FIG. 14. According to this method, in front of a nozzle 11 are radially arranged three-color sublimable-dye sticks 12 on a plane perpendicular to the axis of the nozzle, and there are also provided a laser beam source 13 and an air system 14. A lens system 15 is driven such that the laser beam from the laser beam source 13 is condensed and irradiated on a desired sublimable dye stick 12 out of the three colors of the sublimable dye sticks 12 to produce vapor of that dye. The dye vapor is jetted from the tip of the nozzle 11 by action of compressed air blown out from the air system

14 and attached to the surface of a recording member 16.

In the case of the present method, the flow of the compressed air blown out from the nozzle 11 impinges on the recording member 16 and diverted thereby from its course and spread around the nozzle 11 along the recording member 16. Since the dye vapor transported by the compressed air is thus spread to a rather wide range compared with the diameter of the nozzle 11, and so it becomes impossible to provided high resolution of the image.

OBJECT AND SUMMARY OF THE INVENTION

An object of the invention is to attain image recording of high resolution.

Another object of the invention is to attain high speed recording.

A further object of the invention is to provide sublimable dye vapor with necessary and sufficient vapor pressure for jetting even if heating temperature therefor is low.

Still another object of the invention is to provide the apparatus to achieve the above mentioned objects in a simpler structure.

Other objects of the invention will become apparent from the following description.

According to the present invention, dye vapor is produced from heated sublimable dye, and vapor of condensable substance produced by heating the condensable substance is mixed with the dye vapor and a mixed vapor is thereby formed, and this mixed vapor is jetted to a recording member with its jet amount controlled, whereby the vapor of the sublimable dye included in the mixed vapor is attached to the recording member and a picture image is formed thereon.

And, even if the vapor pressure of the dye vapor of the sublimable dye is low, the mixed vapor can have higher vapor pressure than that of the dye vapor alone because the vapor pressure of the vapor of the condensable substance is added thereto, and so satisfactory jetting is attained by the mixed vapor. Further, the pressure of the vapor of the condensable substance is readily controlled through regulation of the temperature for heating the condensable substance, the amount of the condensable substance to be supplied to the heating portion, and so forth, and therefore the jetting condition of the mixed vapor is controlled quite easily. For such reason, necessary and sufficient vapor pressure for jetting is obtained, even if the heating temperature for the sublimable dye is low, and high speed recording is made possible.

Furthermore, the mixed vapor jetted to the recording member is cooled while it is flying or when it reaches the recording member and the vapor of the condensable substance in the mixed gas condenses and reduces in volume, and this prevents the flow of the mixed vapor from spreading along the surface of the recording member and makes recording of considerably high resolution possible.

DETAILED DESCRIPTION OF THE PREFERRED EMBODIMENT

Figure 1:
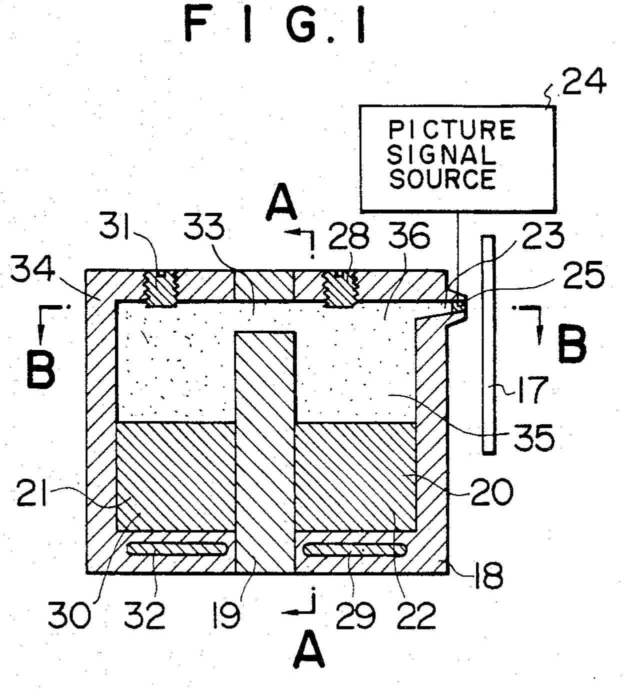
FIG. 1 is a side view in vertical cross-section showing a first embodiment of the invention.
Figure 2:
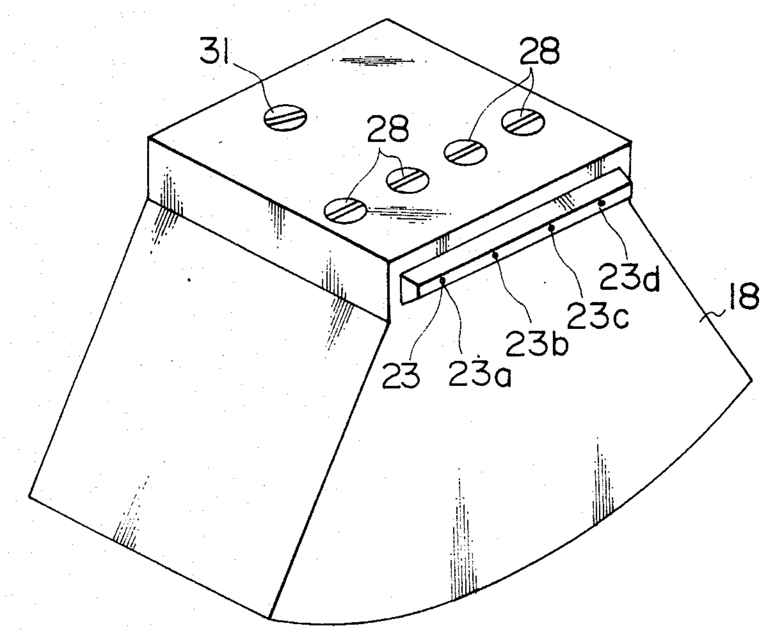
FIG. 2 is a perspective view of the above.
Figure 3:
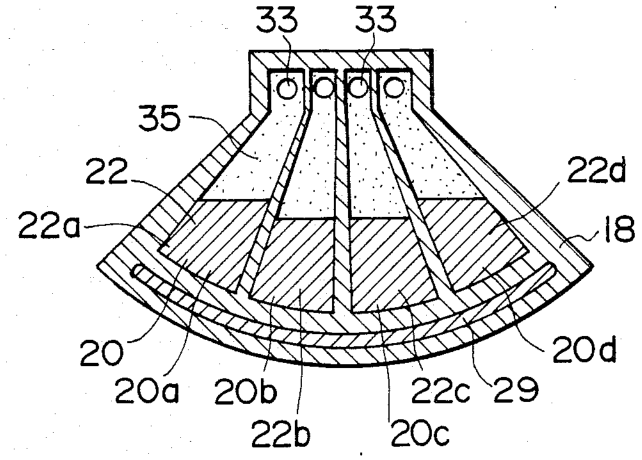
FIG. 3 is a cross-sectional view taken along line A—A of FIG. 1.
Figure 4:
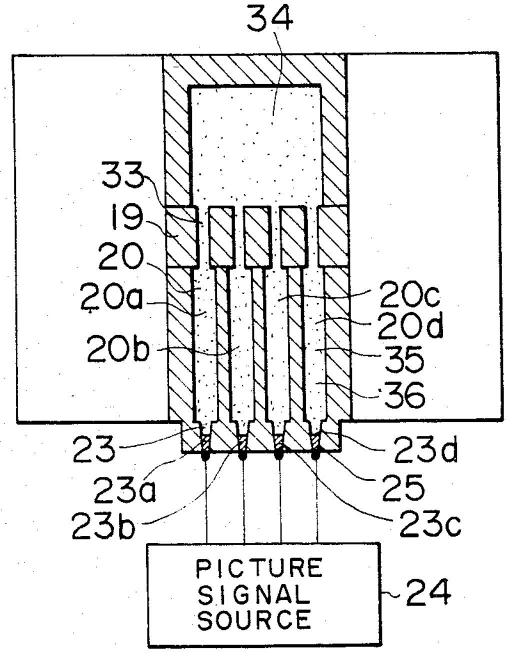
FIG. 4 is a cross-sectional view taken along line B—B of FIG. 1.

A first preferred embodient of the invention will be described with reference to FIGS. 1 to 9. A recording head 18 is operably disposed to oppose a recording member 17 for shifting, relatively thereto, along the face thereof. The recording head 18 is divided into two portions, front and back, by a heat insulation partition 19, and there are formed a dye chambers 20 and a condensable substance chamber 21, respectively.

The dye chambers 20 is of a sector shape when seen from its front, and therein are radially disposed four sector-shaped dye chambers 20*a*, 20*b*, 20*c*, and 20*d*. And within the dye chambers 20, there are contained sublimable dyes 22, that is, a cyan dye 22*a* is contained in the dye chamber 20*a*, a magenta dye 22*b* in the dye chamber 20*b*, a yellow dye 22*c* in the dye chamber 20*c*, and a black dye 22*d* in the dye chamber 20*d*.

Figure 5:
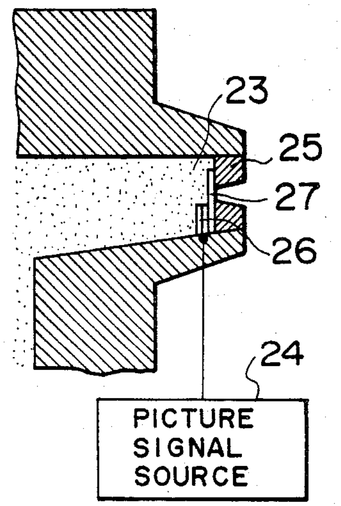
FIG. 5 is an enlarged partial side view in vertical cross-section of nozzle portion.

In front of the dye chambers 20, there is formed a nozzle assembly 23. The nozzle assembly 23 is formed of four nozzles 23*a*, 23*b*, 23*c*, and 23*d* corresponding to the dye chambers 20*a*, 20*b*, 20*c*, and 20*d*, respectively. Each of the nozzles 23*a*, 23*b*, 23*c*, and 23*d* is provided with a jet amount control device 25 connected with a picture signal source 24. The jet amount control device 25 is adapted by means of an electrostriction resonator or magnetostriction resonator to control flow resistance in the nozzle 23. The jet amount control device 25 of the present embodiment is formed of an electrostriction resonator 26 as shown in FIG. 5 and the electrostriction resonator 26 is connected with a valve 27 for opening and shutting the opening in the nozzle 23. The electrostriction resonator 26 used has good heat-resisting property since the subliming temperatures of the sublimable dye 22 are as high as 200° to 250° C. The same is said of the case where the magnetostriction resonator is used. It is preferred to use such materials that their Curie points are as high as about 300° C.

Above the dye chambers 20, there are provided dye supply portions 28 corresponding to the dye chambers 20*a*, 20*b*, 20*c*, and 20*d*. Below the dye chambers 20, there is provided a heater 29 as means for heating the sublimable dyes. The heater 29 is provided in a single body for all of the dye chambers 20*a*, 20*b*, 20*c*, and 20*d*.

In the condensable substance chamber 21 is contained such as condensable substance 30 as ethyl alcohol and acetone. On the top face of the condensable substance chamber 21 is provided a condensable substance supply portion 31 for supplying the condensable substance 30 and below the same is embedded a heater 32 as means for heating the condensable substance.

At the upper portion of the heat insulation partition 19, there are provided communicating holes 33 communicating with each of the dye chambers 20*a*, 20*b*, 20*c*, and 20*d*, through which condensable vapor 34 produced in the condensable substance chamber 21 is supplied to each of the dye chambers 20*a*, 20*b*, 20*c*, and 20*d* and mixed with dye vapors 35 produced in the dye chambers 20 and mixed vapors 36 are thus formed.

In the described structure, the sublimable dyes 22 in the dye chambers 20*a*, 20*b*, 20*c*, and 20*d* are sublimed by heating by the heater 29 and turned into the dye vapors 35 to fill the respective dye chambers 20*a*, 20*b*, 20*c*, and 20*d*. Meanwhile, the condensable substance 30 is heated within the condensable substance chamber 21 by the heater 32 and turned into the condensable vapor 34. The condensable vapor 34 enters into the dye chambers 20*a*, 20*b*, 20*c*, and 20*d* through the communicating holes 33 and formed into the mixed vapors 36 mixed with the dye vapors 35.

The vapor pressure of the thus formed mixed vapor 36 is equal to the total of that of the dye vapor 35 and that of the condensable vapor 34. Therefore, since the vapor pressure of the condensable vapor 34 is controllable by regulation of the heating temperature of the heater 32, the vapor pressure of the mixed vapor 36 is also controlled. Thus, by setting the vapor pressure of the mixed vapor higher than the pressure outside the recording head 18, the mixed vapor 36 is jetted by force when the nozzle 23 is opened.

The jet amount control device 25 is driven by a picture signal from the picture signal source 24 so as to actuate the electrostriction resonator 26 to open or shut the valve 27 by vibration and the amount of the mixed vapor 36 jetted from the nozzle 23 is thereby controlled. The jetting of the mixed vapor 36 is made by force since the vapor pressure of the mixed vapor 36 is rather higher as described above and thus the mixed vapor 36 flies for sure toward the recording member 17.

The mixed vapor 36 that flies in the described manner is cooled while flying and upon reaching the surface of the recording member 17 and the condensable vapor 34 included in the mixed vapor 36 is cooled and condensed and as a result the mixed vapor 36 reduces in volume. Such reduction in volume of the mixed vapor 36 prevents the flow of the mixed vapor 36 from spreading around the nozzle 23 along the recording member 17, and therefore the dye vapor 35 included in the mixed vapor 36 does not spread out when it is attached to the recording member 17 and forms a minute picture element substantially of the same diameter as the nozzle 23. Thus, a picture imgae of quite high resolution can be recorded.

Since the present embodiment uses four colors of sublimable dyes 22, namely, cyan dye 22*a*, magenta dye 22*b*, yellow dye 22*c*, and black dye 22*d*, it can record a color picture image. For forming a color picture image, a first method is to dispose the nozzles 23*a*, 23*b*, 23*c*, and 23*d* properly oriented so that the mixed vapors 36 of respective colors may be attached to the recording member 17 at the same point in the same timing. A second method is to orient the nozzles 23*a*, 23*b*, 23*c*, and 23*d* in parallel with each other but to adapt the recording head 18 to traverse from side to side along the in-line arrangement of the nozzles 23, and to shift the timing of jetting of the mixed vapors 36 from the nozzles 23*a*, 23*b*, 23*c*, and 23*d*, so that sublimable dyes 22 of respective colors are attached to and mixed at the same point on the recording member 17 one after another.

According to the present embodiment as described above, the mixed vapor 36 having higher vapor pressure than the pressure outside the recording head 18 is formed by mixing the condensable vapor 34 with the dye vapor 35 and therefore high speed recording has become possible.

Now, referring to FIGS. 6 and 7, a first experiment will be described. In the graphs, the axis of ordinates is for print density and the axis for abscissas is for printed region. In the experiment, the heating temperature for the dye was 200° C., the room air pressure was kept at 1.034 atmospheric pressure when external air pressure is 1 atmospheric pressure, and the nozzle was made to 107 μm in diameter.

Figure 6:
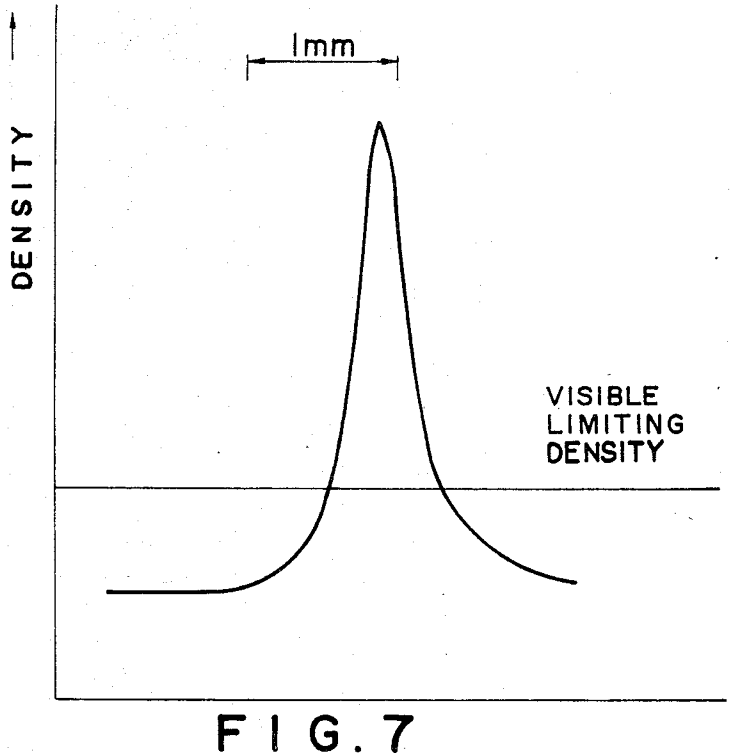
FIGS. 6 and 7 are graphs showing results of a first experiment, characteristics of print density against printed region.
Figure 7:
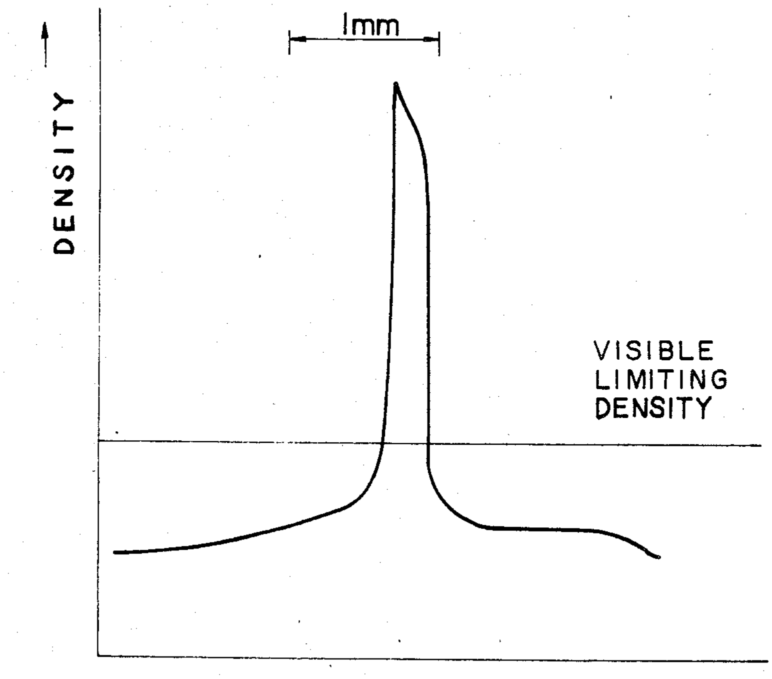

The case where a condensable substance was not used but helium was used is shown in FIG. 6, wherein the printed dot diameter at visible limiting density was about 0.75 mm. Against that, in the case of FIG. 7 where acetone was used as the condensable substance, the dot diameter was about 0.35 mm. In the case of the latter, the dot diameter, namely, the diameter of the recorded picture element, could be made smaller than a half that in the case of the former.

Incidentally, the temperature for heating acetone was set at a slightly higher temperature than its boiling point.

Figure 8:
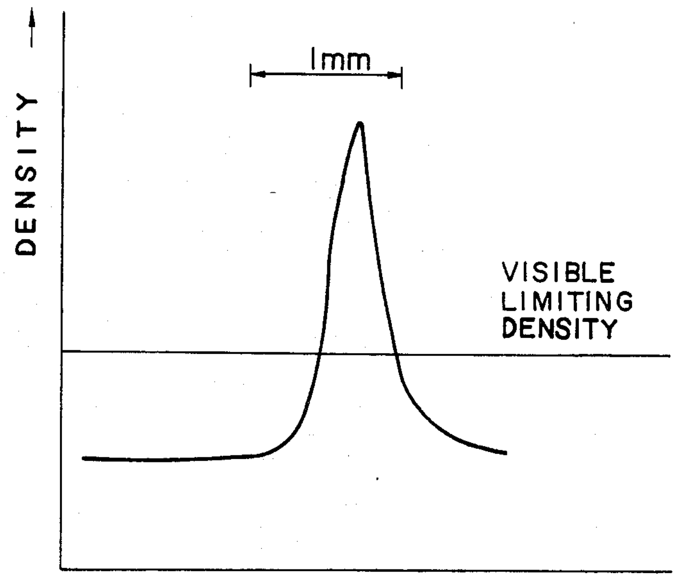
FIGS. 8 and 9 are graphs showing results of a second experiment, characteristics of print density against printed region.
Figure 9:
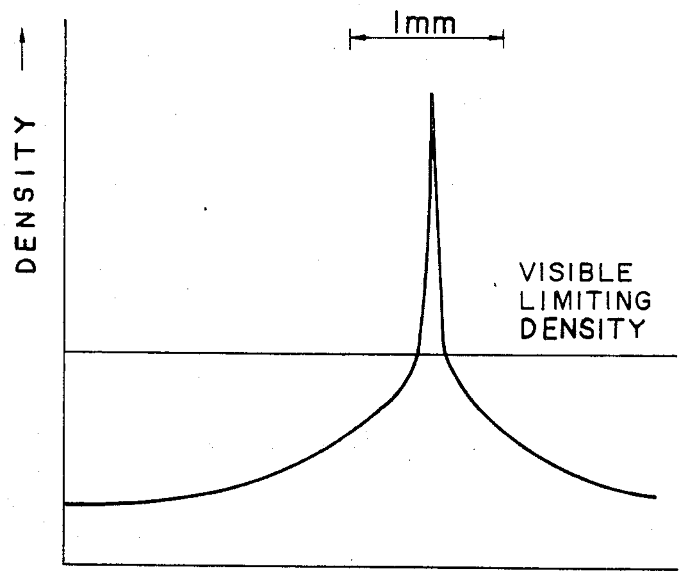

In the second experiment, results of which are shown in FIGS. 8 and 9, the dye was heated to 200° C. the same as in the first experiment, whereas the room air pressure was set at 1.017 atmospheric pressure when the external air pressure was 1 atmospheric pressure and the nozzle was given a smaller diameter of 67 μm.

In the case of FIG. 8, where not a condensable substance but air was used, the dot diameter at the visible limiting density was about 0.5 mm, whereas, in the case of FIG. 9, in which ethyl alcohol was used as the condensable substance, the corresponding dot was about 0.16 mm in diameter. From this alone, it is apparent that the use of the condensable substance is effective for the reduction in diameter of the recorded picture element.

By the way, the temperature for heating ethyl alcohol was set slightly higher than its boiling point.

Figure 10:
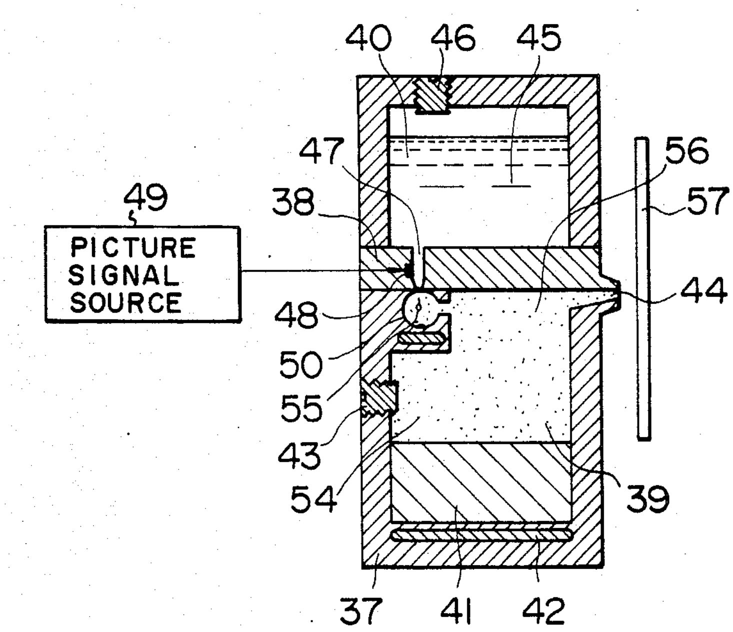
FIG. 10 is a side view in vertical cross-section showing a second embodiment of the invention.
Figure 11:
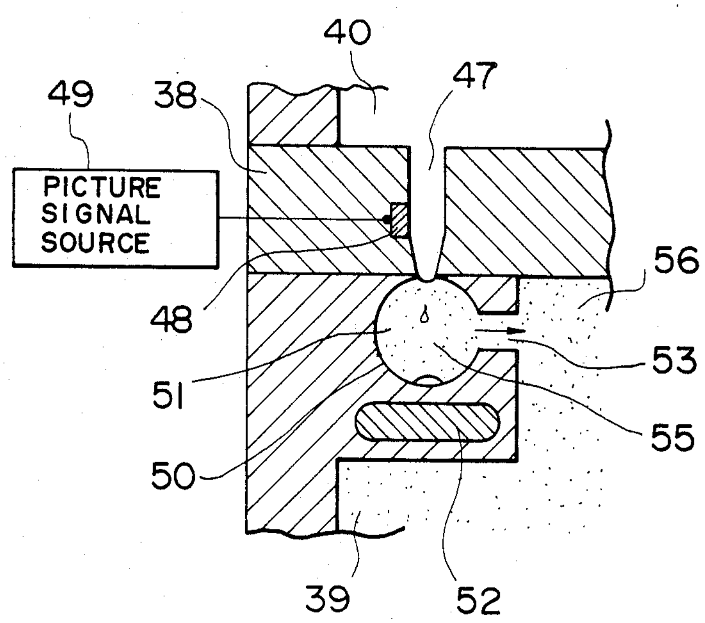
FIG. 11 is an enlarged side view in vertical cross-section of a portion of the above.
Figure 12:
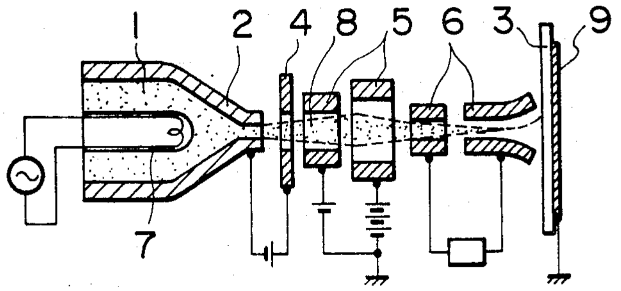
FIG. 12 is a side view in vertical cross-section showing an example of the prior art.
Figure 13:
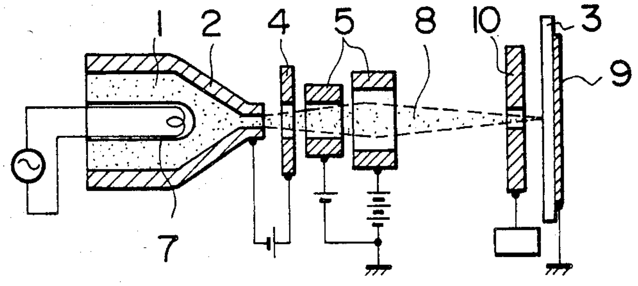
FIG. 13 is a side view in vertical cross-section showing another example of a picture image recording apparatus of the same system as that of FIG. 12.
Figure 14:
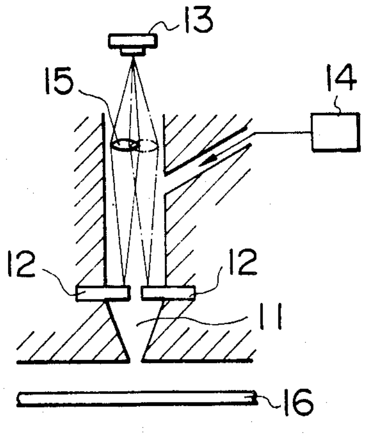
FIG. 14 is a side view in vertical cross-section of another system in the prior art.

Now, referring to FIGS. 10 to 11, a second embodiment of the present invention will be described. A recording head 37 of the present embodiment is divided by a heat insulation partition 38 into upper and lower portions, where a dye chamber 39 and a condensable substance chamber 40 are formed, respectively. The dye chamber 39 contains therein a sublimable dye 41 and is provided at its lower portion with a heater 42. In the rear of the dye chamber 39, there is formed a dye supply portion 43. In front and at the upper portion of the dye chamber 39, there is provided a nozzle 44. The condensable substance chamber 40 contains therein a condensable substance 45 and is provided at its upper portion with a condensable substance supply portion 46.

The heat insulation partition 38 is provided therein with a communicating hole 47 having a diameter such that the condensable substance 45 will not drop therethrough by itself. On this communicating hole 47, there is provided a condensable substance supply device 48 formed of an electrostriction element or the like. The condensable substance apply device 48 is connected to a picture signal source 49. And the condensable substance supply device 48 is provided at its lower portion with a heating portion 50. The heating portion 50 is made up of a spherical vaporizing chamber 51, a heater 52 located thereunder, and a hole 53 opening to the dye chamber 39. In th dye chamber 39 is produced dye vapor 54, while condensable vapor 55 is produced in the vaporizing chamber 51, and mixed vapor 56 of these vapors is formed within the dye chamber 39.

A recording member 57 is disposed opposite to the recording head 37.

In the described structure, when the condensable substance supply device 48 is provided with a signal from the picture signal source 49, the condensable substance 45 drops through the communicating hole 47 into the vaporizing chamber 51 of the heating portion 50, and the condensable substance 45 heated by the heater 52 is vaporized into condensable vapor 55.

Within the dye chamber 39, on the other hand, dye vapor 54 is produced from the sublimable dye 41 heated by the heater 42, and this dye vapor 54 and the above described condensable vapor 55 are mixed into a mixed vapor 56. The vapor pressure within the vaporizing chamber 39 equals the total of the vapor pressure of the dye vapor 54 and that of the condensable vapor 55, and the vapor pressure is controlled specifically by the supply amount of the condensable substance 45 to the heating portion 50. Accordingly, the mixed vapor 56 is jetted from the nozzle 44 by the vapor pressure of the mixed vapor 56 and flies toward the recording member 57. The condensable vapor 55 is cooled while flying toward the recording member 57 and when the same comes in contact with the recording member 57, and this causes the mixed vapor 56 to reduce in volume and enables a fine picture element the same as the nozzle 44 in diameter to be formed as in the prevous embodiment preventing spreading of the mixed vapor 56 around the nozzle 44 along the surface of the recording member 57.

What is claimed is:

1. A method for recording a picture image comprising the steps of heating sublimable dye to generate dye vapor, heating condensable substance to generate vapor of the condensable substance and mixing the same with the dye vapor to form a mixed vapor, jetting the mixed vapor by pressure thereof from a nozzle to a recording member, and controlling the jet amount of the mixed vapor, whereby the sublimable dye is attached to the recording member and a picture image is formed thereon.

2. A method for recording a picture image according to claim 1, wherein the jet amount of the mixed vapor is controlled by regulation of flow resistance in the nozzle.

3. A method for recording a picture image according to claim 1, wherein the jet amount of the mixed vapor is controlled by regulation of the pressure of the mixed vapor.

4. A method for recording a picture image comprising the steps of heating a plurality of sublimable dyes separately in partitioned dye chambers to generate dye vapors of different colors, heating condensable substance to generate vapor of the condensable substance and mixing the same with the dye vapors to form mixed vapors of a plurality of kinds, jetting the mixed vapors by pressure thereof from a plurality of nozzles provided for the respective dye chambers to a recording member, and controlling the jet amount of the mixed vapors, whereby the sublimable dyes are attached to the recording member and a picture image is formed thereon.

5. A method for recording a picture image according to claim 4, wherein the plurality of nozzles are oriented to converge into a point on the recording member so that the plurality of sublimable dyes are attached to and mixed at the same point in the same timing.

6. A method for recording a picture image according to claim 4, wherein a recording head is adapted to travel along the direction of in-line arrangement of the plurality of nozzles and the mixed vapors are adapted to be jetted from the respective nozzles in slightly shifted timing so that the sublimable dyes of different colors are attached to and mixed at the same point on the recording member one after another.

7. A picture image recording apparatus comprising substantially dye heating means for generating dye vapor of the sublimable dye, condensable substance heating means for generating condensable vapor of the condensable substance, means for mixing the condensable vapor with the dye vapor for forming a mixed vapor, a nozzle for jetting the mixed vapor therefrom, and control means for controlling jet amount of the mixed vapor jetted from said nozzle.

8. A picture image recording apparatus according to claim 7, wherein said control means is adapted to regulate flow resistance in said nozzle.

9. A picture image recording apparatus according to claim 7, wherein said control means is adapted to regulate pressure of the mixed vapor.

10. A picture image recording apparatus comprising a dye containing chamber for containing sublimable dye, sublimable dye heating means provided at the lower portion of said dye containing chamber for generating dye vapor of the sublimable dye, a condensable substance containing chamber for containing therein condensable substance, condensable substance heating means provided at the lower portion of said condensable substance containing chamber for generating condensable vapor of the condensable substance, a communicating portion provided between said dye containing chamber and said condensable substance containing chamber for mixing the condensable vapor with the dye vapor and forming a mixed vapor, a nozzle for jetting therefrom the mixed vapor, and control means for controlling jet amount of the mixed vapor jetted from said nozzle.

11. A picture image recording apparatus according to claim 10, wherein said control means is adapted to control flow resistance in the nozzle.

12. A picture image recording apparatus according to claim 10, wherein said control means is adapted to regulate pressure of the mixed vapor.

* * * * *